(12) United States Patent
Burroughs et al.

(10) Patent No.: US 11,878,277 B2
(45) Date of Patent: Jan. 23, 2024

(54) PACKAGING FOR NATURAL PEANUT BUTTER

(71) Applicants: Geoffrey Philipp Burroughs, Rockville, MD (US); Adrienne McGill Burroughs, Rockville, MD (US)

(72) Inventors: Geoffrey Philipp Burroughs, Rockville, MD (US); Adrienne McGill Burroughs, Rockville, MD (US)

(*) Notice: Subject to any disclaimer, the term of this patent is extended or adjusted under 35 U.S.C. 154(b) by 562 days.

(21) Appl. No.: 16/967,042

(22) PCT Filed: Mar. 1, 2019

(86) PCT No.: PCT/US2019/020337
§ 371 (c)(1),
(2) Date: Aug. 3, 2020

(87) PCT Pub. No.: WO2019/169288
PCT Pub. Date: Sep. 6, 2019

(65) Prior Publication Data
US 2021/0046437 A1  Feb. 18, 2021

Related U.S. Application Data (60) Provisional application No. 62/637,500, filed on Mar. 2, 2018.

(51) Int. Cl.
*B01F 27/00* (2022.01)
*B01F 27/88* (2022.01)
(Continued)

(52) U.S. Cl.
CPC .............. *B01F 27/88* (2022.01); *A23L 25/10* (2016.08); *B01F 27/071* (2022.01);
(Continued)

(58) Field of Classification Search
CPC ......... B01F 35/3202; A47J 2043/04481; A47J 43/0722; A23L 25/10; A23V 2002/00
See application file for complete search history.

(56) References Cited

U.S. PATENT DOCUMENTS

| 4,973,168 A |   | 11/1990 | Chan |
| 5,567,047 A | * | 10/1996 | Fritsch .................. A47J 43/082 403/325 |

(Continued)

OTHER PUBLICATIONS

Witmer Products, Inc. 'Natural Peanut Butter Mixer'; May 6, 2017; Downloaded; https://web.archive.org/web/20170506011034/http://www.witmerproducts.com/pbutter.html.

*Primary Examiner* — Anshu Bhatia
(74) *Attorney, Agent, or Firm* — Steven Scott Lloyd; Gordon Feinblatt LLC (57) ABSTRACT

The invention of the present disclosure is that of functional packaging systems useful for reducing the separation of solid and liquid constituents of its contents. The invention is particularly useful for preventing the undesirable separation of solid and oil phases of food products such as natural peanut butter that is manufactured without the use of undesirable additives such as hydrogenated vegetable oils, lecithin, monoglycerides, diglycerides and other substances that slow separation of the solid and oil phases from one another. In one embodiment, the invention comprises a container with a rotating base which when rotated actuates the agitation of the product contained within, as a result of the concurrent rotation of one or more axes configured with an agitator or equivalent means of stirring or mixing the contents. The invention is further provided with hermetic sealing means and the like to ensure food safety.

4 Claims, 5 Drawing Sheets

(51) Int. Cl.
*A23L 25/10* (2016.01)
*B01F 27/07* (2022.01)
*B01F 27/9212* (2022.01)
*B01F 33/501* (2022.01)
*B01F 35/32* (2022.01)
*B01F 101/06* (2022.01)

(52) U.S. Cl.
CPC .... *B01F 27/9212* (2022.01); *B01F 33/50111* (2022.01); *B01F 35/3202* (2022.01); *A23V 2002/00* (2013.01); *B01F 2101/06* (2022.01)

(56) References Cited

U.S. PATENT DOCUMENTS

| | | | |
|---|---|---|---|
| 10,864,490 B1* | 12/2020 | Zolorzano | A47J 31/005 |
| 2008/0066486 A1 | 3/2008 | Halterman | |
| 2015/0196881 A1 | 7/2015 | Rabii | |
| 2015/0320262 A1* | 11/2015 | Stefanoni | A47J 43/042 99/287 |
| 2015/0374175 A1* | 12/2015 | Garr | B01F 33/50111 366/314 |

* cited by examiner

PACKAGING FOR NATURAL PEANUT BUTTER

CROSS-REFERENCE TO RELATED APPLICATIONS

This application claims the benefit of the priority date of U.S. Provisional Patent App. No. 62/637,500, the contents of which are incorporated herein by reference in their entirety.

STATEMENT REGARDING FEDERALLY SPONSORED RESEARCH

The invention described in the present disclosure was made without federal funding.

BACKGROUND OF THE INVENTION

Consumers have become more and more concerned in recent years about not only the nutritional value of the foods they eat, but also transparency in terms of knowing what is contained in the food products they purchase for consumption. Consumers more and more are demanding food products that contain only wholesome, natural ingredients, and are selecting products that are made from natural ingredients, certified organic, lacking in ingredients harvested from genetically modified source materials, and free of additives and preservatives that have been used traditionally to stabilize certain properties of food products, improve shelf life, and make product appearances more appealing.

Peanut butter has proven to be an extremely versatile and popular manufactured food product over the years. As such, many consumers who enjoy peanut butter, as well as similar products such as almond butter and cashew butter, seek natural alternatives to the most popular brands of peanut butter, which tend to contain additives that improve product consistency, for the reasons mentioned above. Many such additives are formulated into peanut butter to prevent the separation of peanut oil and peanut solids in the container during storage. Additives used for this purpose include hydrogenated vegetable oils, lecithin, monoglycerides, diglycerides and other substances that slow separation of the solid and oil phases from one another. These additives are considered undesirable by many health-conscious consumers due to their lack of nutritive value and chemical names, which are not perceived as natural.

Natural peanut butter in its most basic form consists of peanuts and peanuts alone, or perhaps with small amounts of sugar or salt added for flavor. Peanut butter is legally defined in the United States as consisting of at least 90% peanuts. Unfortunately, while many natural alternatives to highly commercialized, additive-containing brand name peanut butters and the like are on the market, they suffer from the problem of separation of the solid and oil phases as the jars sit on the shelves of homes and supermarkets. The typical approach by consumers to overcoming this problem is to simply stir the product with a kitchen utensil such as a knife or spoon. This approach can be messy and cumbersome, leading consumers of natural peanut butters and similar products with a long-felt need for a more elegant solution that allows them to more easily reduce the amount of separation of solids and oils using a method that is more easily carried out than the traditional approach of stirring with implements that are not part of the product packaging.

SUMMARY OF THE INVENTION

The invention of the present disclosure is that of functional packaging for nut butters and products that exhibit phase separation of solids and liquids such as oils in a similar manner that facilitates quality improvements to the product contained therein. More specifically, the invention is that of an improved container for, by way of example and not limitation, natural or organic peanut butter and similar products that typically require stirring or some similar physical manipulation or agitation to overcome the problem of separation of solids from oils within the container, which occurs inevitably over time as the products sit in storage. For the purposes of this disclosure, reference to liquids and oils are meant to be considered equivalent.

One advantage of the present invention over the prior art is that the present invention is that of an integrated, functional package useful for the packaging of natural peanut butter and the like in a manner that allows consumers to stir the product contained therein by rotating the base of the container while it remains closed, as opposed to opening the container and using some external implement to stir or agitate the product. Previous attempts to solve the problem of the solid and oil phases of natural peanut butter separating during storage have focused on devices to be inserted into the opened container, which leads to the soiling of such devices with peanut butter, which in turn creates the need that they be cleaned between uses.

In one embodiment, the invention of the present disclosure is directed to an improved package for the storage and handling of natural peanut butter. As used herein, the term "natural peanut butter" refers to peanut butter that comprises at least 90% peanuts, with no functional additives that alter its thickness or texture. A common problem experienced by consumers of natural peanut butter is that it must be stirred vigorously virtually every time it is opened from storage, as without additives such as hydrogenated vegetable oil, the solid and oil phases of the product separate, making it difficult to achieve a uniform, spreadable product comparable in consistency to that of peanut butter containing one or more of said additives. One of ordinary skill in the art will appreciate that the invention of the present disclosure, while designed to improve the uniformity and spreadability of natural peanut butter in one embodiment, will also be useful for doing the same to other products comprising oils and solids that separate during storage.

In one embodiment, the improved package of the present disclosure may comprise a container such as that which one of ordinary skill in the art will appreciate as the equivalent of a typical peanut butter container, although other container shapes may be employed. The package further comprises an agitator within the container that may be rotated without opening the container, such as by a rotating base with an upwardly projecting axle attached that extends into the container and engages with the agitator to rotate it when the base is rotated. An agitator as devined herein may be any means within the container capable of stirring or agitating its contents, preferably without opening the container. The container may be modified to allow an axle to enter the jar through an opening in the lower surface of the container, so it can engage with the agitator. The interface between the opening and the axle is most preferably hermetically sealed to keep the contents of the container isolated from the external environment, such as with a cap configured to create such a seal. In one embodiment, the upper end of the agitator is equipped with a button or functional equivalent that may be used to disengage the agitator from the axle or equivalent means of engagement. The button or equivalent extends above the contents of the container to a point where it is visible below any hermetic sealing means or lid that is temporarily affixed across the area of the top of the container but extends above the contents of the container.

DETAILED DESCRIPTION OF THE INVENTION

In one embodiment, the invention is that of a functional packaging system comprising a plastic, thermoformed container or equivalent that one of ordinary skill in the art will recognize as similar in size and shape a typical nut butter container, although containers of different sizes and shapes may be used. The system comprises an opening in the bottom surface of the container that allows an axle to protrude downward through the opening, where it is attached or otherwise affixed to a rotating base. In one embodiment, the base is equipped with receptacle for the axle and outer side walls that allow the jar to rest snugly within the base while allowing the base to freely rotate around the jar such that an affixed axle will rotate as the base is rotated.

Figure 1:
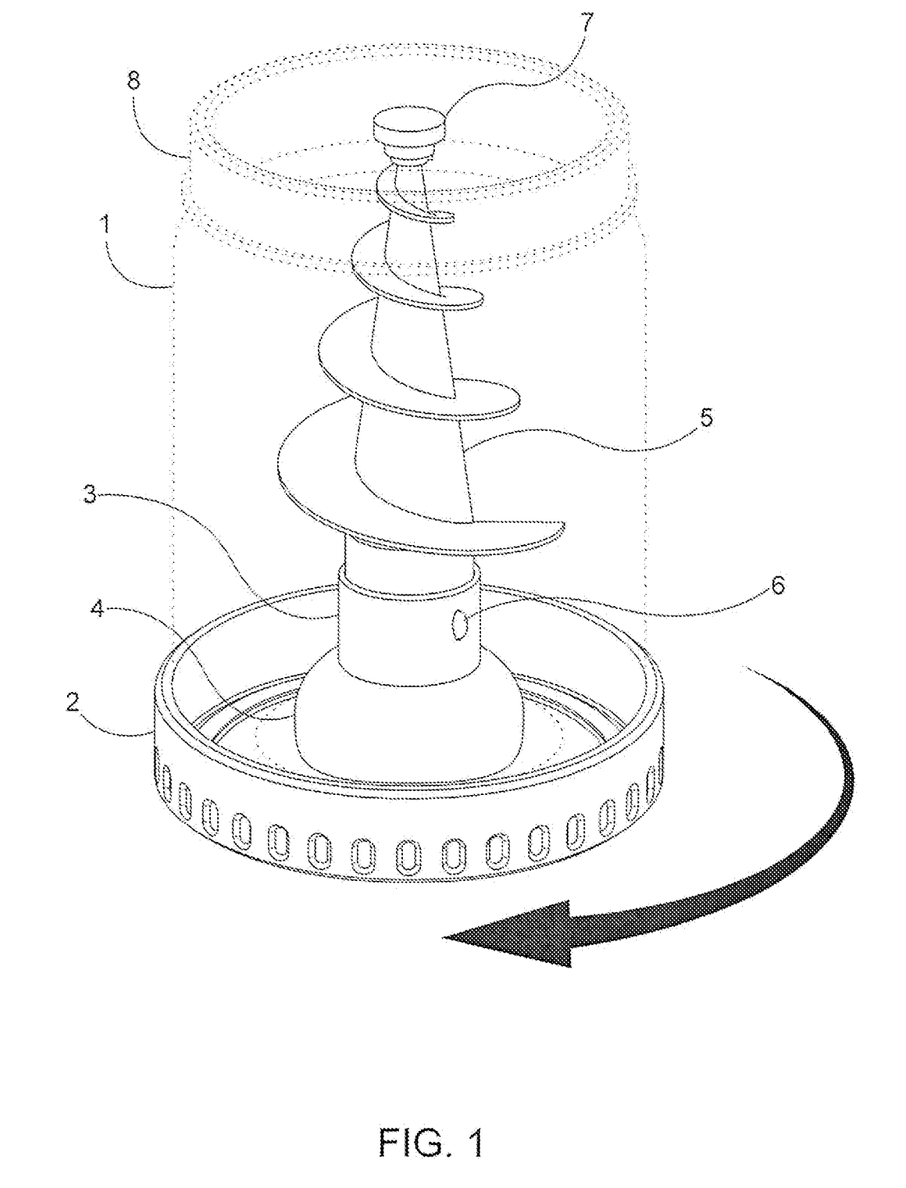
FIG. 1 depicts one embodiment the invention of the present disclosure including a container (1), a rotating base (2), an axle (3) with a cap (4) for creating a seal (not shown) between the contents of the container (1) and external atmosphere, an agitator (5) with a lock mechanism comprising an engagement means (6) that reversibly locks into a hole in the upper portion of the axle, which may be retracted by pressing the button (7) atop the agitator (5) to actuate a rotatable spring mechanism (not shown) that allows the engagement means (6) to lock the agitator (5) reversibly to the axle (3), the upper button surface extending slightly below the upper circular plane of a container lid (8).

In one embodiment of the invention of the present disclosure as shown in FIG. 1, the system comprises a container 1 resting within the side walls of a rotating base 2, the container comprising an open-ended indentation in the bottom surface (not shown), which one of ordinary skill in the art will appreciate as normally being substantially planar to slightly concave. The open-ended indentation (not shown) may be achieved, for example and not by way of limitation, through thermoforming or a functionally equivalent manufacturing process. In the embodiment of FIG. 1, the axle 3 comprises an upper portion, a lower portion and a cap 4 that fits over the open-ended indentation when the lower portion of the axle 3 is inserted downwardly through the opening and engaged with the rotating base 2, leaving the upper portion free to engage with an agitator 5, defined herein as a mechanism for setting the contents of the container 1 into motion, for example but not by way of limitation, by stirring or mixing. The cap 4 is useful in preventing the contents of the container 1 from exiting the container 1 and protecting the contents from the surrounding atmosphere. Most preferably, the system further comprises a means of hermetically sealing the interface between the opening in the bottom of the container 1 and the axle 3 such that any food grade contents in the jar do not come into contact with the air outside the container 1 at the interface.

Continuing with FIG. 1, the agitator 5 may be configured as an auger or functional equivalent. One of ordinary skill in the art, however, will appreciate that it is not essential that the agitator 5 take the form of an auger. For example, and not by way of limitation, the agitator could comprise one or more revolving angled blades affixed to a shaft much like a propeller. As long as the agitator 5 enables a user of the invention to stir or mix the contents of the container 1 adequately for achieving its primary purpose of mechanically reversing the separation of solids from liquids (e.g., oils), for example but not by way of limitation, where the container's contents comprise natural peanut butter, the agitator 5 is adequate.

Figure 2:
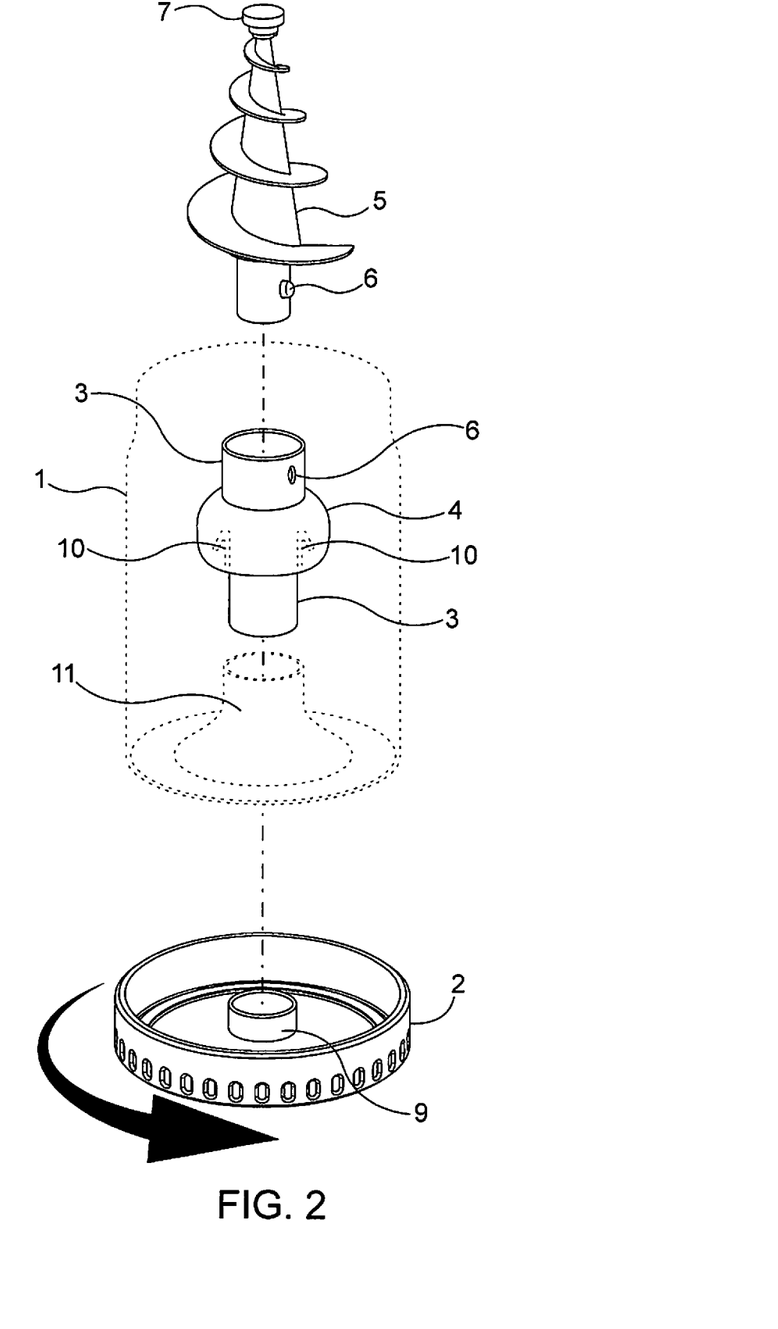
FIG. 2 provides an exploded view of FIG. 1, wherein the container (1) is shown removed from the rotating base (2), with both the upper and lower portions of the axle (3) visible, the cap (4) being affixed to the axle with the agitator (5) disengaged from the axle (3), with the engagement means (6) shown disengaged from the axle (3) and the agitator (5) removed. A receptacle (9) for the lower portion of the axle (3) is shown as an extension of the rotating base (2), and a seal (10) is provided inside the cap (4) that locks over an open-ended indentation (11) all the way around its opening to form a seal between the container (1) and external atmosphere is shown.

Turning now to FIG. 2, the agitator 5 may engage with the upper portion of an axle 3. The agitator 5 may comprise an auger with a lower shaft similarly shaped to the upper portion of an axle 3 but slightly smaller in diameter, wherein the lower shaft may be inserted into the upper portion of the axle 3 and lock into place via an engagement means 6, which may comprise a retractable protrusion and a hole in the upper portion of the axle 3 through which the retractable protrusion extends to lock the agitator 5 into the axle 3. The shaft can lock into the axle 3, for example and not by way of limitation, via an engagement means 6 that comprises a retractable protrusion actuated by a rotatable spring-lock mechanism (not shown) comprising a button 7 such as that one of ordinary skill in the art will appreciate as being of the type used with the spring-loaded cartridges of most retractable ink pens, and a hole in the upper portion of the axle 3 through which the protrusion can protrude when aligned with the hole, locking the agitator shaft into the axle 3. The protrusion may retract inwardly toward the center of the lower shaft of the agitator 5 when the button 7 is depressed, thereby disengaging the agitator 5 from the axle 3.

Continuing with FIG. 2, the container 1 may comprise an open-ended indentation 11 configured to fit over a receptacle 9 of the rotating base 2, wherein the container fits snugly within the side walls of the rotating base 2 and the axle 3 can be inserted into the open-ended indentation 11 and into the receptacle 9 to engage with the rotating base 2. In one embodiment, the axle 3 may be shrouded by a cap 4 comprising a seal 10 that fits around the upper circumference of the open-ended indentation 11 to form a seal, and most preferably a hermetic seal that protects the contents of the container 1 from the surrounding atmosphere. Once the axle 3 is engaged with the rotating base 2, the agitator 5 can then be reversibly locked into the upper portion of the axle 3 via engagement means 6, enabling a user of the invention to rotate the agitator 5 by rotating the rotating base 2, thereby agitating the contents of the container 1 to reduce the separation of solids and liquids within the contents. Ideally the container 1 is lidded during operation to avoid spillage of the contents.

Figure 3:
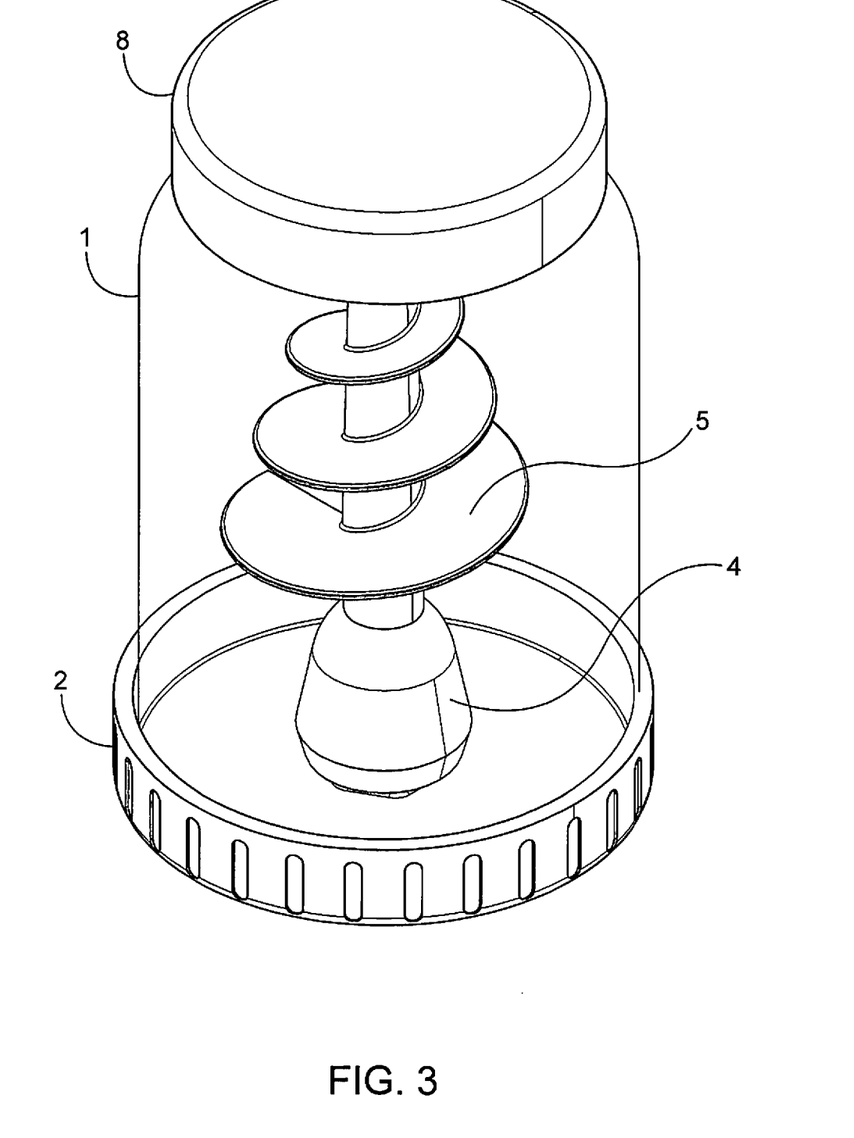
FIG. 3 shows an assembled embodiment of the invention of the present disclosure in perspective view, comprising a container (1) with lid (8) and rotating base (2) engaged with an axle (not shown) obscured by a cap (4), the axle being engaged with an agitator (5).

FIG. 3 provides a perspective view of one embodiment of the invention, showing a container 1, rotating base 2, agitator 5, cap 4 and lid 8. Not shown and beneath the cap 4 is an axle engaged with a receptacle of the rotating base 2 and the agitator 5, as well as as seal between the cap 4 and an open-ended indentation of the container.

Figure 4:
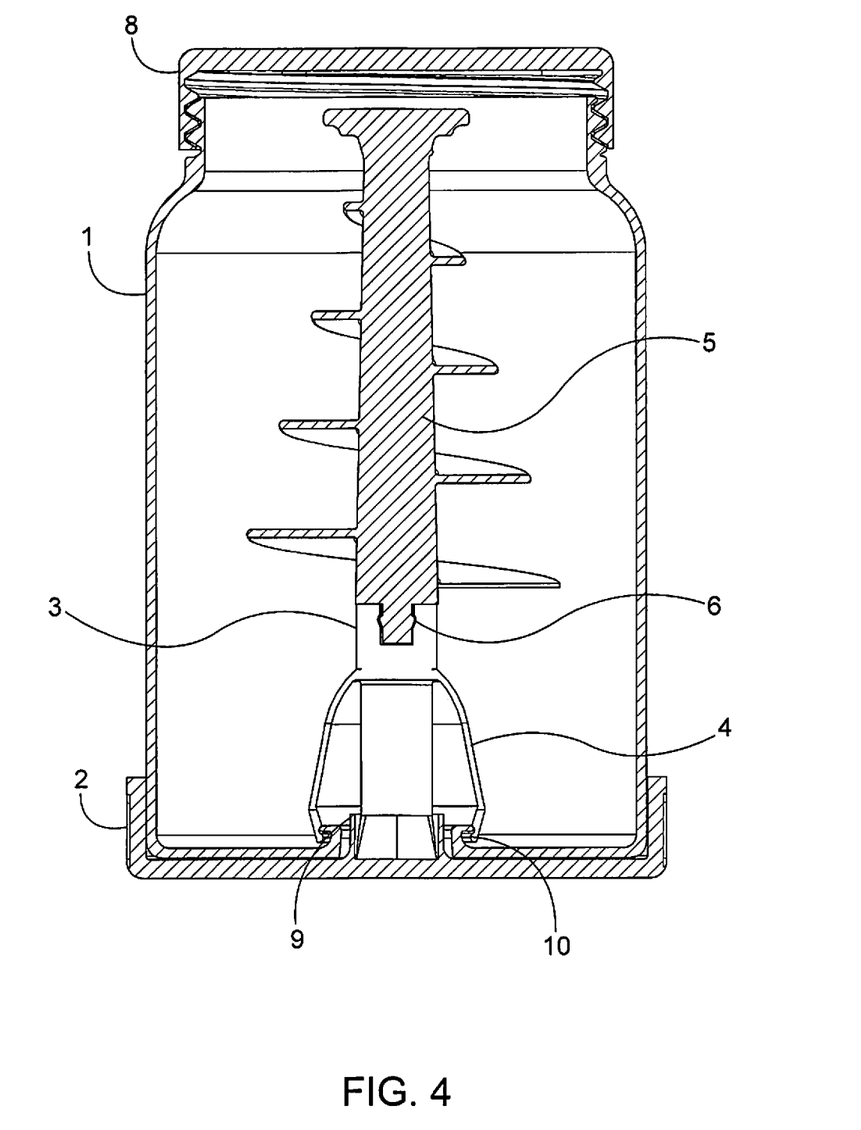
FIG. 4 shows a cross-sectional view of the embodiment the present disclosure shown in FIG. 3, comprising a container (1) with lid (8) and rotating base (2), wherein a receptacle (9) is engaged with an axle (3) and cap (4), wherein the engagement of the receptacle (9) and cap (4) creates a seal (10) between the contents of the container (1) and the external atmosphere. The axle (3) is reversibly engaged with an agitator (5) via an engagement means (6).

FIG. 4 provides a cross-sectional view of an embodiment of the invention of the present disclosure comprising an outer container 1, rotating base 2 and lid 8. Within the outer constituents are a receptacle 9 of the rotating base 2 receiving the lower portion of an axle 3, the axle 3 being partially separated surrounded by a cap 4 that interlocks with an open-ended indentation of the container 1 to form a seal 10 that separates the container interior from the external atmosphere. The axle 3 is interlocked with an agitator 5 via engagement means 6 comprising a downward extension of the agitator shaft comprising an outward protrusion and corresponding indentation of the axle 3 that are capable of interlocking with the outward protrusion. The outward protrusion of the agitator shaft may be retracted by pulling upwardly on the agitator 5, the outward protrusion being of suitable material and fitted such that the agitator shaft may be simply inserted into and removed from the axle 3 by applying slight downward pressure or pulling upward on the agitator 5, respectively.

Figure 5:
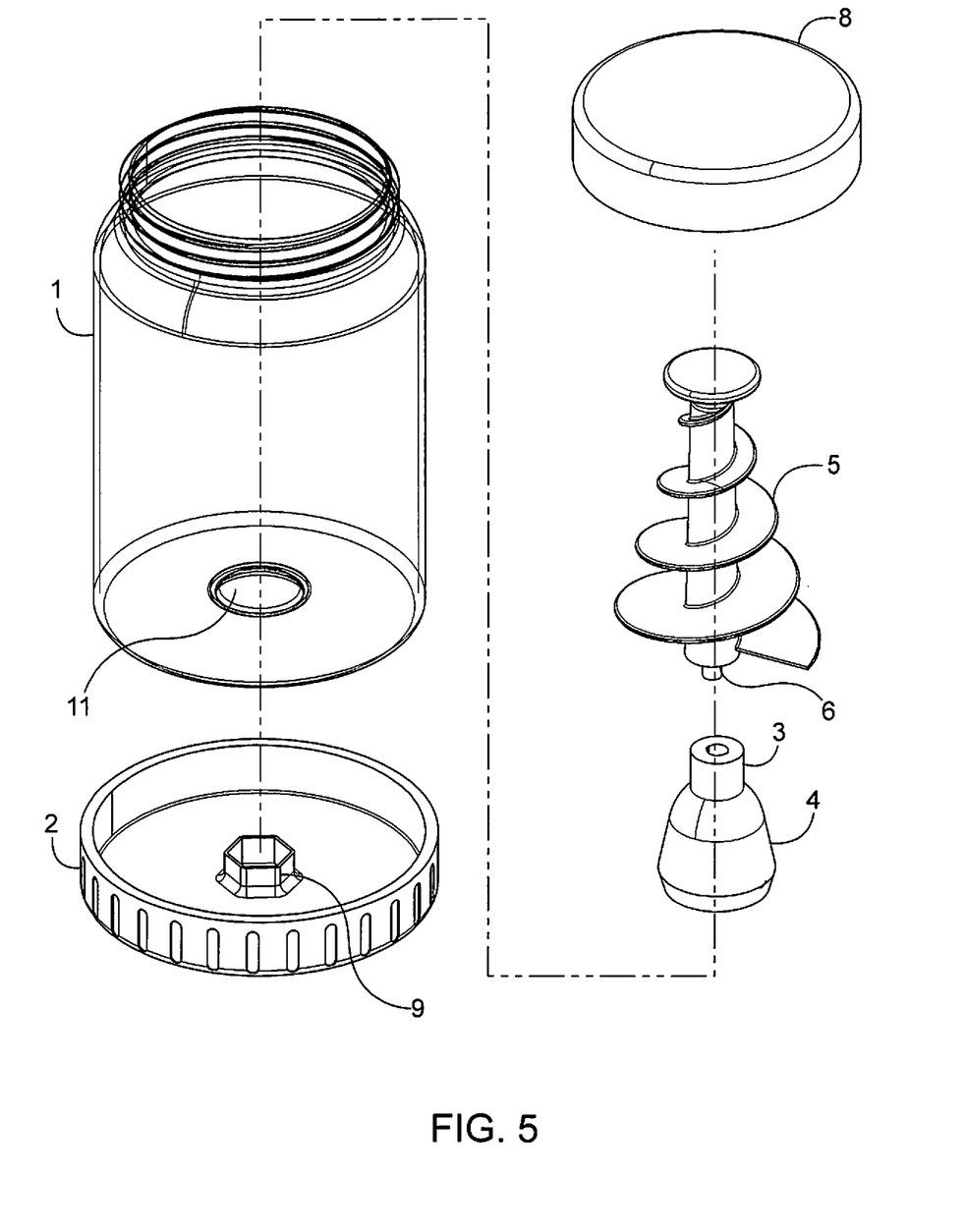
FIG. 5 is an exploded view of the embodiment of the present disclosure shown in FIG. 4, showing a container (1) that fits over a receptacle (9) via an open-ended indentation (11), allowing for placement of an axle (3) with cap (4) into the receptacle (9) with the cap (4) fitting over the open-ended indentation (11) and forming a seal (not shown) therewith. An agitator (5) can then inserted into the axle (3) and reversibly engaged therewith via an engagement means (6) that may be engaged and disengaged by pressing down on or pulling up on the agitator (5), respectively.

FIG. 5 shows an exploded view of the embodiment shown in FIG. 4, where the receptacle 9 of the rotating base 2 is configured as a hexagonal receptacle 9 of suitable size to allow a container 1 to be inserted within the side walls of the rotating base 2 such that the receptacle 9 is inserted upwardly through an open-ended indentation 11 of the container 1. An axle 3 with surrounding cap 4 is configured such that the lower portion of the axle 3 is hexagonal (as shown in FIG. 4) and capable of fitting snugly within the receptacle 9 such that the cap 4 forms a seal 10 (see FIG. 4) between the container 1 and surrounding atmosphere by engaging with the upper portion of the open-ended indentation 11. The agitator 5 is then inserted reversibly into the axle 3 as shown in FIG. 4 and the lid 8 secured atop the container 1.

One of ordinary skill in the art will appreciate that the ideal container types to be used as described in the present disclosure will be those currently used for the packaging of peanut butter and other nut butters, although the scope of the invention is not limited to exclude other types of containers. One of ordinary skill in the art will further appreciate that the type of plastic used in such containers is likely to be most ideal for modification in creating the containers to be used as part of this invention. One of ordinary skill will further appreciate that the manufacturing lines currently existing around the world will be best suited to mass produce modified containers for use with the present invention, which contain an opening in the bottom surface of the containers, e.g., through the formation of an open-ended indentation to the bottom surface of each container.

One of ordinary skill in the art will appreciate that while the drawings illustrate the rotating base of the invention as having a centrally positioned receptacle into which the axle of the present invention inserts, the receptacle is not an essential feature of the invention, and that the axle may be affixed to the base without the need for the receptacle. A key functional attribute of the invention is that when the base is rotated by the user, the axle rotates in kind. This functional attribute is achievable by assuring the axle is affixed to the base by any means. Furthermore, one of ordinary skill will appreciate that using modern plastics manufacturing technology, an embodiment of the present invention may comprise a unitized constituent that is equivalent to a combination of the rotating base 2, receptacle 9, axle 3, cap 4, agitator 5, engagement means 6 and button 7 (optional), wherein a suitable container 1 could be placed over the unitized combination of these features, filled with contents and affixed with a seal comprising a lid 8.

One of ordinary skill in the art will appreciate that while the drawings illustrate a preferred embodiment wherein the rotating base has short side walls that allow the container to nestle snugly within the side walls, that the planar surface of the base with the axle affixed is a critical attribute from a functional standpoint. To wit, while the rotating base is ideally circular and slightly larger in diameter than the bottom of the container, as long as the rotation of the base results in the rotation of the affixed axle, the desired functionality is achieved, assuming the axle is engaged with a functional agitator or equivalent. Of course, since the applicant contemplates the invention will be put to manual use by consumers of natural peanut butter and the like, the side walls of the rotating base depicted in the drawings with indentations or openings around them that allow for better hand grip and leverage may be most preferable.

An important feature of the invention is the engagement means that enables the axle to engage with the agitator in a way that causes the agitator to rotate with the rotating base and affixed axle. This enables the user to stir or mix the desired contents e.g., separated natural peanut butter in order to improve its organoleptic attributes, such as texture and thickness, enabling a better consumer experience that approximates the consumer experience with brand name peanut butters that contain undesirable additives that slow the separation of nut solids from nut oils, without said undesirable additives.

The cap is a feature of the invention acts as a means for preventing the product contained in the jar from entering the opening in the bottom of the jar through which the upper portion of the axle extends for engagement with the agitator. While the invention is enabled with or without the cap, the invention is improved if the cap is present, as the contents of the jar are less likely to leak into the opening in its bottom surface. FIG. 2 depicts that in one embodiment, wherein there is an upwardly directed, open-ended indentation from the bottom surface of the jar, the cap may also operate as a hermetic seal around the opening by virtue of the notches within the cap's interior that seal over the upper walls of the indentation. However, one of ordinary skill in the art may appreciate that a seal could be achieved by use of an O-ring that fits tightly between the axle and the upper wall of the open-ended indentation to seal off the opening. Alternatively, in embodiments where there is an opening in the bottom surface of the jar without any indentation, the space between the axle and the opening could be sealed off by some alternative means, which would be functionally equivalent to the system depicted in FIG. 2.

One of ordinary skill will also appreciate that the engagement means that enables the upper portion of the axle to engage with the agitator may be achieved in other ways than those depicted in the drawings. For example, the inner walls of the upper portion of the axle could be threaded to receive a complementarily threaded lower agitator shaft, enabling the user to screw the agitator into place. Alternatively, the agitator shaft could be made continuous with the axle and achieve the same functionality in terms of being able to stir or mix the contents of the jar. However, it is a concept of the applicant that the agitator be removable, thus an engagement means that allows for disengagement is provided.

While a jar lid is not a key component of the invention, one of ordinary skill in the art—or the ordinary consumer, particularly of natural peanut butter—will appreciate that jars containing these consumer products come with lids, and many are hermetically sealed by a membrane beneath the lid when the lid is removed. While the system of the present invention may work without a lid, in the preferred embodiments a lid on the top of the jar is present, which enables the user to, for example, hold the jar in a horizontal orientation and gain leverage from holding the lid firmly in one hand and rotating the base clockwise to facilitate stirring or mixing by the agitator.

As is discussed previously in the application, there is a long-felt need in the art for an integrated, functional packaging system that will allow consumers to experience natural peanut butter without the need for additional instruments for stirring or mixing the package contents when the peanut butter separates into solid and oil phases. This will have the effect of promoting the purchase of more wholesome and healthy peanut butters and other similar products and reduce the industry's reliance on synthetic ingredients such as hydrogenated vegetable oils to improve the texture attributes of the product.

What is claimed is:

1. A functional packaging system for reducing the separation of solid and liquid constituents contained within, the system comprising:
    a lidded container having at least one opening in its bottom surface;
    a gearless rotating base comprising at least one receptacle and at least one corresponding axle capable of engagement with the rotating base through the at least one opening and when received into the least one receptacle, wherein engagement of the axle with the rotating base causes the axle to rotate at the same rate as the base when the base is rotated;
    at least one agitator capable of engagement with the at least one axle, wherein engagement of the agitator with the axle causes the agitator to rotate when the axle is rotated, wherein the at least one axle and at least one agitator are contained within the container between the rotating base and container lid such that the at least one agitator is configured to agitate contents of the container when rotated and the rotating base is freely rotatable at least 360 degrees in the clockwise and counterclockwise directions around the bottom of the container when the at least one axle is engaged with the rotating base; and at least one cap that at least partially surrounds the at least one axle and the at least one opening is at least one open-ended indentation.

2. The functional packaging system of claim 1, wherein the at least one cap is configured with at least one member capable of engagement with the at least one open-ended indentation to form a seal that at least partially prevents the contents of the container from coming in contact with the surrounding atmosphere.

3. The functional packaging system of claim 2, wherein the seal is a hermetic seal.

4. The functional packaging system of claim 1, wherein the rotating base, the at least one axle the at least one agitator and the at least one cap are a single unit.

* * * * *